United States Patent [19]
Wolters et al.

[11] Patent Number: 5,164,155
[45] Date of Patent: Nov. 17, 1992

[54] FUEL BUNDLE WITH SHORT AND INTERMEDIATE PART LENGTH RODS MINIMIZED FOR FLOW INDUCED VIBRATION RISK AND ROD BOW

[75] Inventors: Richard A. Wolters; Anthony P. Reese; Thomas G. Dunlap, all of San Jose, Calif.

[73] Assignee: General Electric Company, San Jose, Calif.

[21] Appl. No.: 695,663

[22] Filed: May 6, 1991

[51] Int. Cl.$^5$ .............................................. G21C 3/34
[52] U.S. Cl. ..................................... 376/441; 376/438; 376/439; 376/370
[58] Field of Search ............... 376/441, 438, 439, 442, 376/370, 379, 448; 976/DIG. 65, DIG. 66, DIG. 69

[56] References Cited
U.S. PATENT DOCUMENTS

| | | | |
|---|---|---|---|
| 3,853,701 | 12/1974 | Sasaki et al. | 376/362 |
| 4,155,807 | 5/1979 | Schreiber et al. | 376/438 |
| 4,357,298 | 11/1982 | Wolters, Jr. et al. | 376/441 |
| 5,017,332 | 5/1991 | Dix et al. | 376/370 |

Primary Examiner—Brooks H. Hunt
Assistant Examiner—Meena Chelliah
Attorney, Agent, or Firm—Robert R. Schroeder

[57] ABSTRACT

A fuel bundle having spacers optimally deployed is disclosed wherein the distance between the spacers varies along the length of the fuel bundle. The fuel bundle has a dense fuel rod array (preferably in the range of 10×10). It includes at least one part length rod extending from the lower tie plate toward but not to the upper tie plate, which part length rod terminates at a spacer and defines under the upper tie plate overlying the end of the spacer a vent volume for the preferential venting of vapor moderator (steam) from the fuel bundle. A vertical spatial distribution of the spacers is disclosed in which the bottom spacers in the single phase region of the fuel bundle are relatively closely vertically spaced and the upper spacers are relatively more distantly vertically spaced one from another. The design enables optimum resistance to flow induce vibration and rod bow, minimum interference of the spacers with pressure drop in the sensitive upper two phase region of the fuel bundle, and the required bracing of part length rods adjacent their ends.

18 Claims, 3 Drawing Sheets

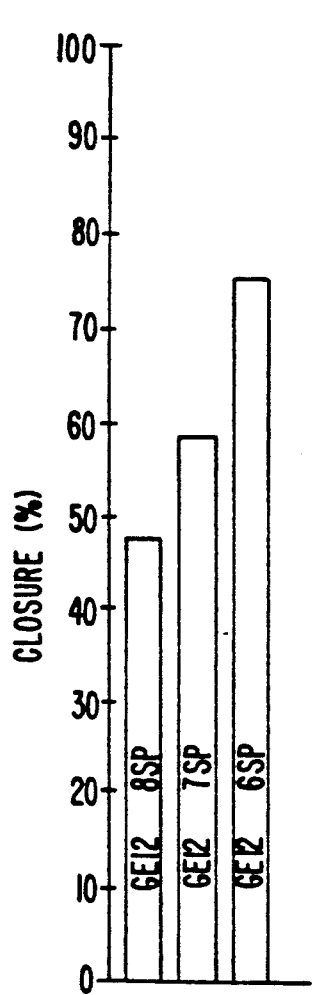
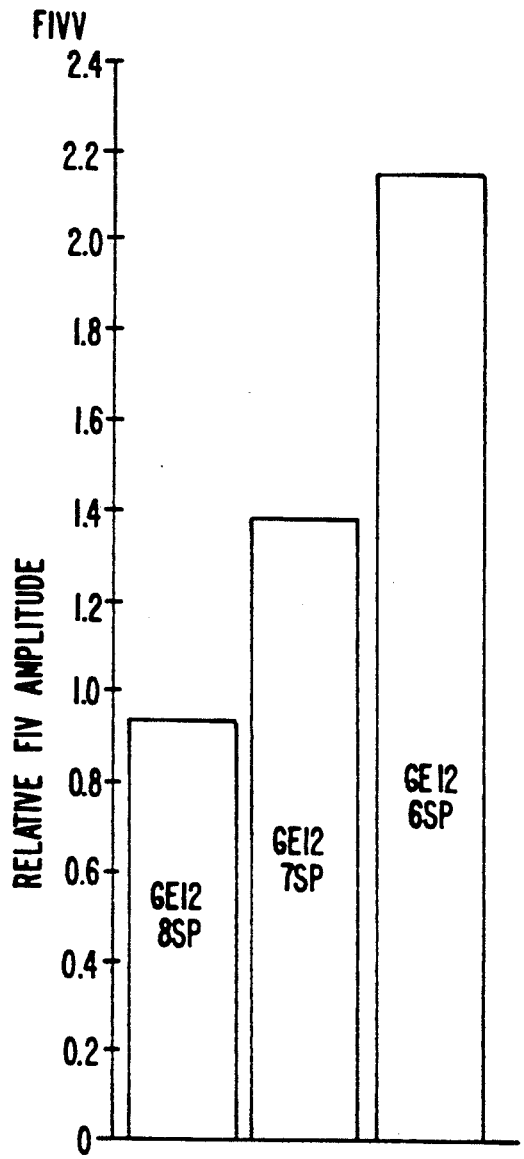
FIG. 2.
FIG. 3.

FUEL BUNDLE WITH SHORT AND INTERMEDIATE PART LENGTH RODS MINIMIZED FOR FLOW INDUCED VIBRATION RISK AND ROD BOW

This invention relates to fuel bundles for boiling water nuclear reactors. More particularly, this invention discloses a fuel bundle having a distributed and uneven spatial separation between spacers in a fuel bundle. A relatively narrow spatial separation is defined in the lower single phase region of the fuel bundle and a larger spatial separation is defined in the upper two phase region of a fuel bundle for promoting minimized flow induced vibration risk and rod bow.

BACKGROUND OF THE INVENTION

Fuel bundles utilized in modern boiling water nuclear reactor cores have had their basic structural components changed in both dimension and design. Before beginning a discussion of these structural components, a brief review of their conventional orientation is useful.

Fuel bundles in boiling water nuclear reactors include upper and lower tie plates supporting therebetween a matrix of upstanding fuel rods. These fuel rods are held in spaced apart relation and supported on a lower tie plate, and braced in a vertical upstanding relationship by an upper tie plate.

The tie plates have two functions. First, they support and/or brace the fuel rods. Second, they define intermediately of the support points for the fuel rods spatial intervals for the flow of coolant through the tie plates. In the case of the lower tie plate, spatial intervals are defined for permitting the inflow of liquid coolant. In the case of the upper tie plate, spatial intervals are defined for permitting the outflow of coolant in both the liquid and vapor form.

The fuel bundles are typically surrounded by a channel. This channel confines coolant flow between the tie plates. Thus the interior of the fuel bundle defines a steam generating path that is effectively isolated from the exterior of the fuel bundle.

When a nuclear reactor is operating, the upstanding fuel rods are within a thermal neutron flux. This flux is partially the function of the coolant-moderator (which is water) taking fast neutrons which are a product of the nuclear reaction and slowing these neutrons to thermal neutrons which continue the reaction. Thus, the coolant present within the fuel bundles contributes to the nuclear chain reaction producing energy within the nuclear reactor.

Finally, and for the purpose of combatting both rod bow and flow induced vibration, so-called fuel rod spacers are placed along the length of the fuel bundle. In present practice, six to seven evenly separated spacers define a matrix of separating material which individually surrounds each fuel rod and at the same time permits the upward substantially unobstructed flow of moderating coolant between the rods of the fuel bundle.

SUMMARY OF THE PRIOR ART

Fuel bundles in modern boiling water nuclear reactors have tended to include at least two new features which complicate their design. These new features are so-called part length rods (PLRs) and denser arrays of fuel rods within the fuel bundles. A review of these design features which result in complications can be instructive.

The advent of part length rods in the lower single phase region of the fuel bundles is disclosed in Dix et al., U.S. Pat. No. 5,017,332 issued May 21, 1991 entitled Two-Phase Pressure Drop Reduction BWR Assembly Design. In this Patent, a fuel design for a boiling water nuclear reactor is disclosed in which more than one of the fuel rods is a part length rod. This part length rod within the fuel bundles extends less than the full distance between the upper and lower tie plates. Typically, the part length rod ends at and is supported in the vertical upright position by a spacer. Each part length rod defines a void volume overlying its end extending up to and usually through the upper tie plate. In this disclosure, a plurality of void volumes are created in a single fuel bundle.

The utility of part length rods has been set forth. Specifically, such part length rods include improved moderator to fuel ratio in the upper two phase region of the fuel bundle with concomitant reduction in pressure drop in the upper two phase region of the operating fuel bundle. This reduced pressure drop leads improved thermal hydraulic and improved nuclear thermal hydraulic stabilities of the fuel bundle during operation of the reactor. Cold shut-down margin of the reactor is also improved.

In addition to partial length rods, there has been a tendency in the prior art to increase the density of fuel rods in the fuel rod array. Rods have decreased in diameter and increased in number within fuel bundles. Fuel rod arrays have progressed in density from $7 \times 7$ arrays to $10 \times 10$ arrays. Since the dimensions of the fuel bundles has not changed—being approximately 5.25 inches by 5.25 inches—this has meant that the side-by-side spacing of the fuel rods and the diameter and side wall thickness of the fuel rods has decreased. It is important to note that the overall length of the fuel rods has remained unchanged; in short, modern fuel bundles have the same overall dimension as their older counterparts.

These more dense arrays have beneficial results. Generally, the more dense arrays of fuel rods reduce the linear heat generation rate along any given length of fuel rod. As a consequence, fuel temperature is reduced; heat transfer surface area is increased. Resonance absorption due to Doppler broadening is reduced, improving nuclear efficiency. Further, release of fission gases is reduced. In short, by realizing all of these benefits, nuclear fuel designers continue to pursue denser fuel arrays.

Unfortunately, these dense arrays have introduced their own design limitations. These design limitations include increased pressure drop in the fuel bundle together with problems resulting from the increased flexibility of the fuel rods. The problems introduced by increased flexibility of the fuel rods renders the rods within the bundle more susceptible to flow induced vibration as well as rod bowing.

The presence of increased pressure drop in dense array of fuel rods is easy to understand. As the area available for heat transfer increases (and the fuel burns cooler), the flow area adding flow friction and hence pressure drop increases. There results an inherent tendency of the denser arrays to increase pressure drop and therefore increase thermal hydraulic and nuclear thermal hydraulic instabilities.

With regard to flow induced vibration, the small diameter and thinner walled fuel rods are more flexible. They have the same length as their prior art counter parts but their diameter and wall thickness are reduced.

Therefore, flow induced components of force acting on the rods in the horizontal direction tend to vibrate the rods from side to side.

Finally, the tendency for rod bow is increased with the smaller diameter rods. Specifically, the tubing from which fuel rods are constructed is imperfect, having side wall and straightness variations at least within production tolerances. Further, especially at the bottom of the fuel bundle adjacent to the lower tie plate, the tubing is under compressive stresses from the incremental weight of the very fuel rod that is directly above.

Operation of the fuel bundle also generates high temperatures. When these side wall and straightness variations are combined with the temperatures and stresses within the radiation field of a reactor, an expansion or contraction of the metal of the fuel rods occurs which is known as "creep." This creep differentially occurs across the diameter of the fuel rod depending upon the local conditions of stress, temperature, and radiation flux ambient to that particular portion of the fuel rod subject to the creep phenomena. Insofar as this phenomenon is understood, it causes greater departure of the fuel rods from their initial straight disposition over the service life of the fuel bundle.

With respect to both flow induced vibration and rod bow, it will be understood that as the tendency to cause rods to be placed closer together has occurred, the clearance between the individual rods of the fuel bundle design has likewise decreased. This decrease has aggravated the tendency for rod bow and flow induced vibration to cause the possibility of wearing contact between adjacent fuel rods within a fuel bundle. Needless to say, the possibility of wearing contact is to be avoided.

It will further be understood, that with respect to the corners of a fuel bundle adjacent the channel, the problems of fuel rods being out of alignment from either flow induced vibration or rod bow can aggravate critical power considerations. Specifically, and where fuel rods move to and toward the fuel bundle channel walls, flow can be restricted and cooling of the fuel within the fuel rods can likewise be restricted. This being the case, over heating of the fuel rods resulting in limiting of the fuel bundle due to critical power limitations can occur from rod bowing at the corners of the fuel bundles.

It is known in the prior art to have fuel bundle spacers evenly separated by constant dimensional intervals along the length of a fuel bundle. That is to say, the distance between the discrete spacers of the fuel bundles is constant. This is to be distinguished from some fuel bundle designs where the distance between tie plates and the first spacer adjacent the tie plates is different from the otherwise uniform distance remaining between all of the remaining spacers within the fuel bundle.

SUMMARY OF THE INVENTION

A fuel bundle having spacers optimally deployed is disclosed wherein the distance between the spacers varies along the length of the fuel bundle. The fuel bundle has a dense fuel rod array (preferably in the range of 10×10). It includes at least one part length rod extending from the lower tie plate toward but not to the upper tie plate, which part length rod terminates at a spacer and defines under the upper tie plate overlying the end of the spacer a vent volume for the preferential venting of vapor moderator (steam) from the fuel bundle. A vertical spatial distribution of the spacers is disclosed in which the bottom spacers in the single phase region of the fuel bundle are relatively closely vertically spaced and the upper spacers are relatively more distantly vertically spaced one from another. The design enables optimum resistance to flow induce vibration and rod bow, minimum interference of the spacers with pressure drop in the sensitive upper two phase region of the fuel bundle, and the required bracing of part length rods adjacent their ends.

OTHER OBJECTS, FEATURES AND ADVANTAGES

An object of this invention is to set forth a variable spacing between spacers along the vertical length of rods within a fuel bundle having both part length rods and a relatively dense array of fuel rods (in the order of 10×10). According to this aspect of the invention, a fuel rod array has its spacers distributed over the 160 inch (13 feet, 4 inch) vertical distance between the upper and lower tie plates. A total of eight spacers—one more than usual—are utilized. Accordingly, nominal spacer separation from bottom to top in the fuel bundle includes for example the bottom three spacers at 16 inch intervals, the middle two spacers at 18 inch intervals, and finally the three top spacers at 20 inch intervals at the top of the fuel bundle.

An advantage of the disclosed design is that the 20 inch spacer separation utilized at the top of the bundle has been found sufficient to resist flow induced vibration. At the same time, the lesser density of the spacers in the vertical dimension at the top of the fuel bundle lessens pressure drop in the upper two phase region of the bundle—a region where reduction in pressure drop improves the operating stability of the fuel bundle. In short, it has been found that even though the forces tending to impart flow induced vibration are at a maximum in this portion of the fuel bundle, the disclose distribution of spacers is sufficient to inhibit such vibration to a satisfactory degree.

An advantage of the disclosed design is that spacer density is increased at the bottom, essentially single phase region of the fuel bundle. It has been found that spacers within the single phase region of the fuel bundle have less effect on overall pressure drop within the fuel bundle.

An additional advantage of the denser distribution of spacers in the bottom single phase region of the fuel bundle is that rod bowing can be optimally resisted. Specifically, the stress of loading of the fuel rods upon the lower tie plate is maximized adjacent the lower tie plate; the regions of the fuel rod overlying the lower tie plate all bear on that part of the fuel rod adjacent the lower tie plate, increasing the incidence of rod bow. It has been found that the denser distribution of fuel rods enables the more aggravated rod bow in this region to be resisted.

BRIEF DESCRIPTION OF THE DRAWINGS

Other objects, features, and advantages of the disclosed invention will become more apparent after reference to the following specification and attached drawings in which:

FIG. 2 is a graphic illustrating the predicted rod bow and percent gap closure responsive to rod bow for various known fuel designs on a statistical basis, it being noted that approximately 5% of the rods will bow to a greater percentile than indicated by the graphic;

FIG. 3 is a second graphic illustrating predicted rod movement due to flow induced vibration showing the maximum amplitude of flow induced vibration plotted for various known fuel bundle designs; and, FIG. 4 is a plot of the length of partial length rods—here shown with short and long lengths—versus the economy of the insertion of such rods within the fuel bundle, the plot here illustrating a way of optimizing partial length fuel rod design to the optimum spacer dimension herein utilized.

DESCRIPTION OF THE PREFERRED EMBODIMENT

Figure 1A:
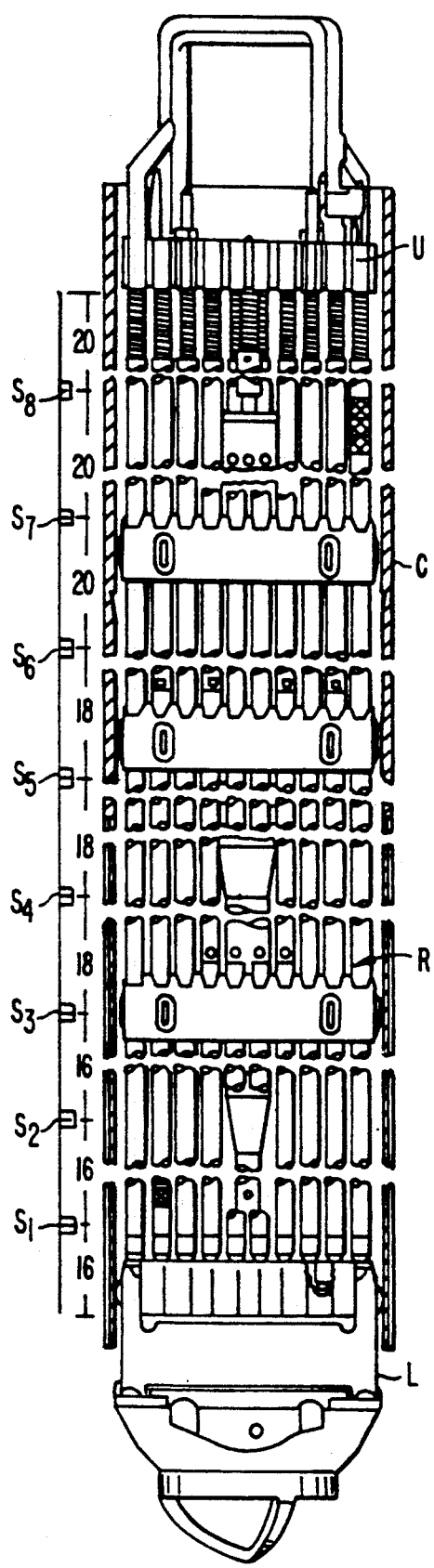
FIG. 1A is a side elevation view of a fuel bundle incorporating the fuel and spacer design of this invention in which the various cross sections of the fuel bundle are laid open to view illustrating two lengths of partial length rods and a large central water rod.

Referring to FIG. 1A, a fuel bundle is illustrated in side elevation section. The fuel bundle B includes a lower tie plate L for supporting fuel rods R in spaced apart side-by-side upstanding vertical relation. The lower tie plate L admits moderator coolant in defined interstitial spaces between the supported rods R.

Upper tie plate U supports the fuel rods R in upstanding relationship and defines interstitially of the fuel rods an outflow area for the liquid and vapor coolant.

A channel C extends between the tie plates. The channel has the function of confining water flow between the tie plates. Additionally, the channel C forms the barrier between the inside of the fuel bundle B and the so-called core bypass volume exterior of the fuel bundle B.

Prior art fuel bundles have included fuel rod arrays having densities in the order of 7×7 up to 9×9. Here, the preferred density of the fuel rods is in the order of 10×10. It is important to understand the effect that this change in density of the fuel bundles has upon the performance of the fuel rods during the dynamics of reactor operation.

Going from 9×9 array to 10×10 array, smaller rod diameters of fuel rods R are required. Such smaller diameters mean as a practical matter that the individual fuel rods R become a lot more flexible with increased tendency to bow and to vibrate. As will hereafter be set forth, these tendencies will be aggravated by reactor operation.

For example, a fuel rod in a 9×9 array has a diameter of approximately 0.45 inches with approximately 0.03 inches of wall thickness. A fuel rod in a 10×10 array has a diameter of approximately 0.40 inches with approximately 0.025 inches of wall thickness. It can therefore be readily understood that the higher rod array density has a fuel rod with reduced supporting cross-section and a thinner cladding thickness.

In order to mitigate this tendency for conventional fuel rod designs, we disclose the presence of an additional spacer. Normally, in such a fuel bundle B over the approximately 160 inches between the upper tie plate U and the lower tie plate L, seven spacers would be utilized. These spacers would be on approximately even 20 inch centers distributed over the 160 inch distance between the upper and lower tie plate. We here utilize eight such spacers over this distance.

In addition, we disclose an uneven spacing between the spacers. In order to mitigate pressure drop—the spacers in the lower portion of the fuel bundle are spaced closely at the bottom of the fuel bundle. Spacers at the top of the fuel bundle are more widely spaced.

For example, we have from the bottom 3 spacers S1–S3 at approximately 16" intervals, 2 spacers S4–S5 at approximately 18" intervals, and 3 spacers S6–S8 at approximately 20" intervals. Thus, it will be understood that spacer density is relatively high at the bottom of the fuel bundle and relatively low at the top of the fuel bundle.

The reader will understand that the view of FIG. 1A is out of scale—in order to render the drawing understandable, it has been necessary to omit much of the vertical length of the fuel bundle B. Because this is the case, the spacing of the spacers S1–S8 is schematically shown to the side of the fuel bundle. The separation of the spacers from their neighboring spacers is indicated in inches.

This high density vertical spacing at the bottom of the fuel bundle and lower vertical spacing at the top of the fuel bundle is done because in the lower single phase region (substantially liquid only) the pressure drop is less per spacer than it is in the upper two phase region.

The closer spacing in the bottom contributes to channel thermal-hydraulic stability. In order to keep the stability within the proper licensed limit—we want the pressure drop from the position of the spacers highest in the bottom of the fuel bundle B and lowest in the top of the fuel bundle B. With this design channel stability is promoted. The combination of increasing the single phase pressure drop, reducing the two phase pressure drop effects improved fuel bundle stability.

It will be remembered that a typical fuel rod R is analogous to a vertical beam subject to dynamic horizontal forces. It is these forces that cause the side-to-side vibration which it is the object of this invention to minimize.

Additionally, it is to be understood that part length rods which must be maintained at their upper most portion in the vertical position by a spacer at the tip. This spacer is so positioned to prevent the part length rod from undergoing side-to-side vibrations at the tip.

Additionally, and as disclosed in the Dix et al Patent Drop Reduction BWR Assembly Design, (now U.S. Pat. No. 5,017,332 issued May 21, 1991, the placement of these partial length rods must maximize fuel efficiency and minimize pressure drop in the bundle.

In the present disclosure, we set forth an embodiment of our invention having a possible two heights of partial length rods. It is to be understood that this disclosure is specifically intended to cover several combinations of part length rod heights.

Figure 1D:
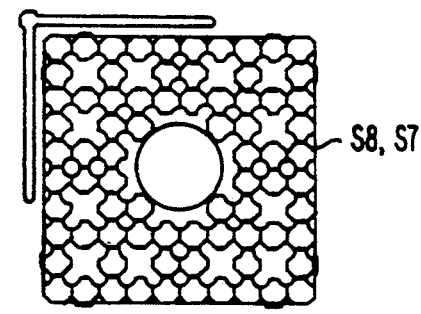
FIGS. 1B–1D are views of the various spacers utilized in the preferred embodiment of FIG. 1A.
Figure 1C:
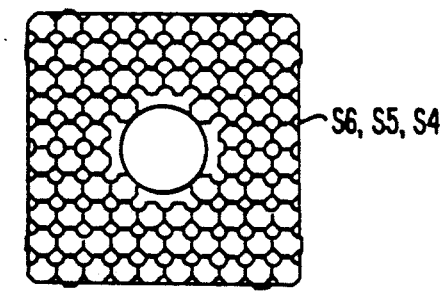
Figure 1B:
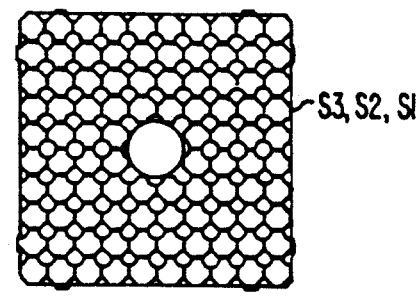

It will be understood, that two types of spacer can be utilized with this disclosure. As illustrated in FIG. 1B–1D, we contemplate spacers having ferrules missing overlying the part length rods. This enables further reduced pressure drop in the upper two phase region of the fuel bundle.

It is preferred that the spacer be maintained with the same cross section throughout the length of the fuel bundle. This allows significant savings in manufacture and assembly. Traveling in core probe (TIPs) may have had a bearing on maintaining equal spacing of these spacers. This is done for the axial positioning of the TIPs because the spacer absorbs neutrons and shows an activity deficit at these positions. In light of this axial positioning requirement, alternate ways to align the TIPs have been tested. These alternate ways of alignment have been accepted at several reactor sites.

Referring to FIG. 2, it will be understood that rod bowing is to be distinguished from flow induced vibration.

With respect to rod bow, the vertical loading forces on the fuel rods are important. These vertical loading forces come from three discrete sources.

First, the weight of the fuel rod itself is an important factor. Specifically, the incremental weight of the fuel rod overlying any section of the fuel rod will constitute on axial load on the fuel rod. Thus, the bottom sections of the fuel rod will be subject to the greatest axial loading forces from the overlying weight of the fuel rod.

Secondly, when the fuel rod is mounted to the fuel bundle, the fuel rod is loaded from the upper tie plate toward the lower tie plate by a spring. This spring of course adds to the loading along the length of the fuel rod that adds to rod bowing.

Finally, those who have skill in the nuclear art will understand that spacers can contribute to the loading of the fuel rods which contribute to bowing. Specifically, each fuel rod is biased at each spacer by a spring against spacer stops. Before any axial movement of the rod at a spacer can occur, the static forces of friction on the rod at the spacer must be overcome.

Rods tend to creep (expand) in the axial direction. Creep is a growth that is enhanced by higher forces on the metal with accompanying higher stresses, higher temperatures, and high flux in the radiation environment. It causes fuel rods to become gradually elongated over their in-service life times.

Before the forces of such creep will permit upward axial movement of the fuel rods at the spacers, the static friction forces of the spacer acting on the fuel rods must be overcome. Until the static forces are overcome, the expansion due to creep of the fuel rods in the axial direction will itself cause the fuel rods to come under a compressive force that will further contribute to the forces tending to cause the rod to bow.

Other factors inducing rod bow are important. Rod cladding is typically fabricated from precisely drawing tubing. The tubing is fabricated from an alloy known as Zircaloy. Despite the exacting specifications, thickness differences in the side walls of the Zircaloy tubing are inevitably present. These thickness differences are accounted for in allowed tolerances specified.

Presuming that the zircaloy varies within the tolerances utilized, it will at some locations have a thinner wall and a thicker wall. This will cause the zircaloy in the area of the wall variations to grow differentially. The thin portion of the wall will grow faster because of the internal forces interior of the fuel rod and the exterior pressure. These interior and exterior forces include the pressure on the walls of the cladding as well as increasing internal pressure accumulated from fission gasses over the life of the fuel rod.

With the newer designs and higher density of full rods, the so-called slenderness ratio (length over diameter) is high. The tendency for the rod to bend increases. In short, under the conditions present in nuclear fuel bundles, a perfectly straight fourteen foot fuel rod R is not possible.

In the disclosed arrangement, we have compromise between forces inducing rod vibration, forces inducing rod bow and forces producing pressure drop in the reactor. Flow vibration wants the spacers to be closer together at the top. Rod bowing demands that the spacers be closer together at the bottom. The hydraulics of fluid flow producing pressure drop within each fuel bundle would dictate that the total number of spacers to be reduced. The disclosed placement of the spacers is a compromise between these three competing factors.

It is possible to criticize the present disclosure for the inclusion of additional spacers. It is believed, however, that the data here presented more than justly amplifies this addition.

It is to be understood that we plot the gap between the adjoining fuel rods as an important portion of our disclosed preferred embodiment. This gap term has been placed into the equations generating the disclosed data because initially rod bow was not that important. In arrays where the rod density is $8 \times 8$ or below, the spatial interval between adjoining fuel rods is large enough and the cladding thickness and cladding diameter large enough so that closure of the rods into contact due to the forces of rod bowing can for the most part be ignored. Where however, the fuel matrix become more dense, rod bow with possible closure of the gaps between fuel rods simply must be taken into account.

It is to be understood that with respect to the plot of FIG. 2, 100% rod bow means that they will touch within the terms of the statistical prediction.

It will be understood that fuel rod to fuel rod gap in a $10 \times 10$ array is in the order of 100 mils. Similarly, the spatial separation from the outer fuel rods to the surrounding channel C is in the order of 140 mils.

Referring to the plot of FIG. 2, it is to be understood that 95% will have the gap (or less) than the variation shown in the graphic. Similarly, it will be understood that gap closure due either to bowing will be worse for the remain 5% of the fuel rods R.

It is to be understood that rod bow is to be avoided. A competent design does not allow for the rods to touch and wear. Although such a design has little effect on the neutron efficiency, wear and consequent rupture of the fuel rod cladding is possible where abrading contact can occur.

A special case is present at the fuel rod corners of the fuel bundle. If the rod bow is toward the corner it will decrease the flow at the channel—and cause a critical power problem. This movement of the fuel rod toward the channel will reduce the amount of water flow available to cool the corner fuel rod. Less moderator will be available for fuel rod cooling. Further slower flow will occur. Interference with the critical power envelope of the rod at this location will occur—limiting the performance of the entire fuel bundle.

Referring to FIG. 3, a comparison of the flow induced vibration amplitude of the fuel bundle herein disclosed is set forth. This comparison is based on open literature equations that allowed the calculations of the stiffness to be made.

Across the X-axis we have the fuel bundle of the invention disclosed herein with effective arrays of 6, 7, and finally 8 spacers vertically distributed. It is to be noted that the 8 spacers are staggered in accordance with the preferred embodiment of this design. Plotted across the Y-axis we have the predicted amplitude. This plot shows that the designs with the fewest number of spacers have the greatest flow induced vibration. It goes without saying that fuel designs with the smaller rod diameters also have the greatest tendency to produce vibration.

It is to be understood that the reduction in the total number of spacers utilized in any given region of a fuel bundle is a worthy pursuit. Such a reduction can also realize substantial stability premiums.

For example, a 1 psi in pressure drop increase is worth about a 0.1 of decay (K) ratio in the stability of a fuel bundle.

It is desired to have a K ratio of less than 1. So all designs should have a margin of less than 1. Normally 0.6 or 0.7 is the preferred K ratio. It is to be noted that the K ratio is measurement of frequency decay. Consequently, where this ratio is greater than 1, an unstable condition is present where the ambient vibrations can tend to increase.

Simply stated, the plot of FIG. 3 illustrates that the designs with the fewest number of spacers have the greatest flow induced vibration. Designs with the smaller rod diameters also have the greatest tendency to produce vibration.

It is further to be noted that higher flow velocity seems to be the leader of the tendency for rod vibration. This must be higher in the upper two phase region of the bundle.

Figure 4:
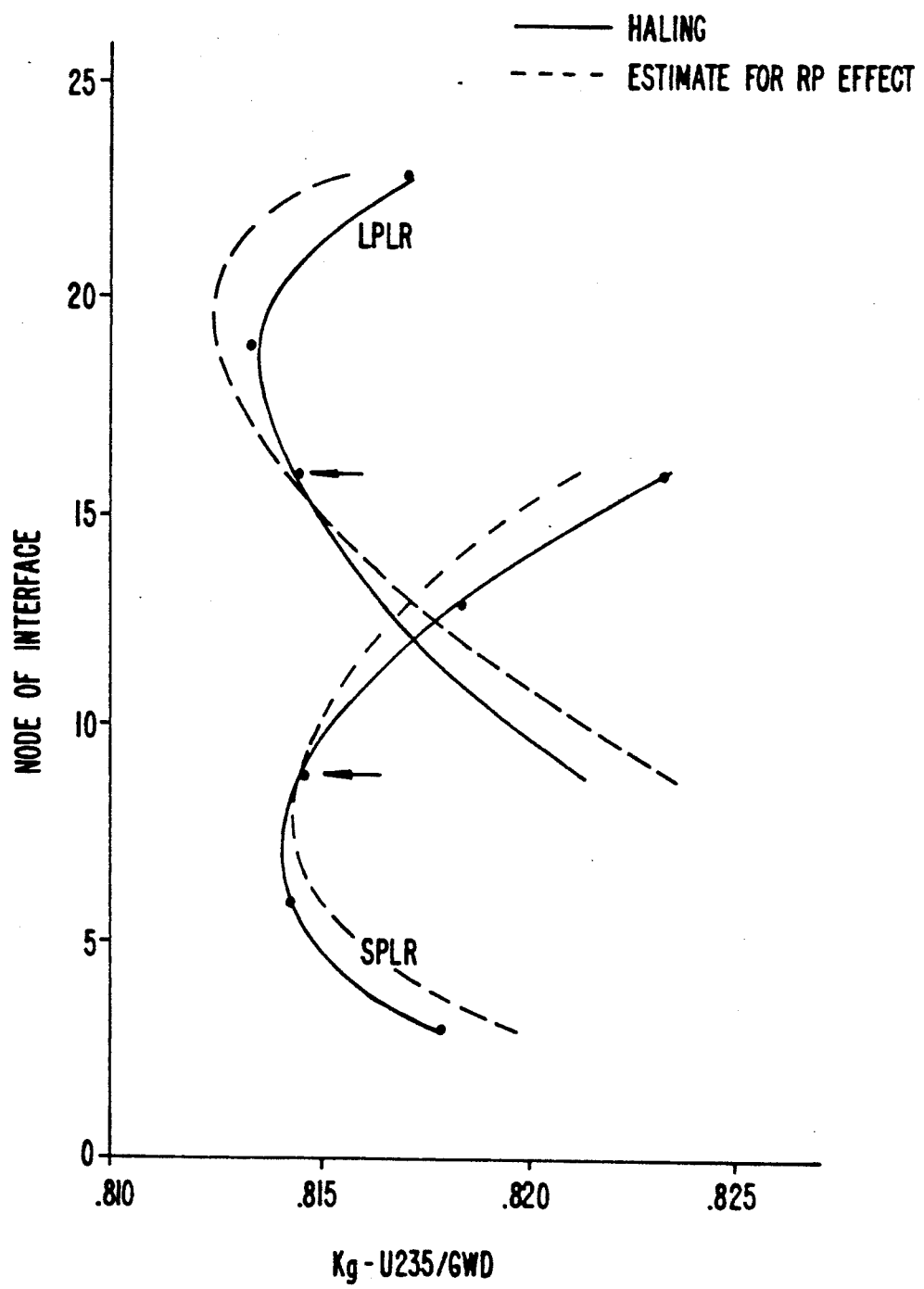

Referring to FIG. 4, an analysis of part length rods in combination with the preferred spacer distribution is illustrated. This plot looks at the length of the partial length rod versus the fuel cycle costs. The length of the fuel rod is plotted in separate curves. The node of the interface vibration is plotted on the Y-axis while the power—or nuclear output—of the fuel rod is plotted on the X-axis.

From this curve, it can be seen that as you increase the length of the partial length rod, you get to a point where the fuel cycle cost is a minimum. This is true for both the long and the short partial length rods which are a preferred portion of this disclosure as well as the short length partial length rods (which are not a portion of the preferred embodiment of this disclosure). It is important to find a compromise between the length of the partial length rods and the spacer length that gives the least amount of resistance.

The term "Node of interface" can be easily understood. Specifically, the core is divided into 25 segments. These segments are spread over an active fuel length of 150 inches. It is to be understood that the fuel occupies only 122 inches of the 160 inch long full length fuel rods.

The convention here utilized comes from the fact that certain computer codes break the core into 6 inch lengths for analysis. The "node of interface" is that point at the end of the partial length rod where support must occur. As has been set forth, it is preferred in the design of partial length rods that a spacer be present adjacent the top portion of the fuel rod so that side-to-side vibration is inhibited at the top of the fuel rod. As can be seen, the plot here illustrated sets optimum lengths for both the long partial length rods—at a node of 96 inches—and the short partial length rods—at a node of 48 inches. It has been determined with partial length rods limited to this length, an optimum fuel economy occurs within the fuel bundle.

The reader will understand that higher densities of fuel rod matrices can be used. For example 11×11 and 12×12 fuel rod arrays are specifically contemplated.

What is claimed is:

1. In a nuclear fuel bundle for receiving single phase water moderator at the bottom thereof and discharging two phase water and steam moderator at the top thereof, said fuel bundle having:
   an upstanding matrix of fuel rods;
   a lower tie plate for supporting said upstanding matrix of fuel rods and permitting the inflow of single phase water moderator to said fuel bundle;
   an upper tie plate for maintaining said fuel rods in said side-by-side matrix and permitting the outflow of two phase water and steam moderator from said fuel bundle;
   a channel surrounding said fuel bundle, said channel extending from said lower tie plate in the single phase region of said fuel bundle to a two phase region of said fuel bundle adjacent said upper tie plate, said channel for confining the flow of moderator between said tie plates and through said matrix of upstanding fuel rods for the generation of vapor moderator; and,
   at least five spacers, each said spacer surrounding each said rod for maintaining said fuel rods in precise side-by-side relation one to another, said spacers having spaced vertical distribution along said matrix of fuel rods interior of said channel to prevent the flexibility of said fuel rods from causing said rods to come into contact under the forces of flow induced vibration or rod bow, the improvement associated with said spacers comprising:
   said spacers placed at uneven vertical spatial intervals along the length of said fuel bundle, with at least two of said spacers at the bottom of said bundle in said single phase region adjacent said lower tie plate having closer relative vertical spacing and at least two of said spacers at the top of said bundle in said two phase region adjacent said upper tie plate having greater relative vertical spacing at the top of said fuel bundle.

2. The invention of claim 1 and including eight said spacers.

3. The invention of claim 1 and wherein said dimension between said upper and lower tie plates is about 160 inches and said relative vertical separation of said lower spacers is about 16 inches and said relative vertical separation of said upper spacers is about 20 inches.

4. The invention of claim 1 and wherein said matrix of fuel rods comprises a 10×10 matrix.

5. The invention of claim 1 and wherein one of said fuel rods in said matrix is a partial length rod, said partial length rod supported on said lower tie plate, terminating before vertical extension to said upper tie plate, and braced at said upper end by one of said spacers.

6. The invention of claim 1 and wherein said fuel bundle includes eight spacers and said bottom three spacers are separated by center to center vertical distances of 16 inches, said top three spacers are separated by center to center vertical distances of 20 inches and spacers in between said top and bottom spacers are separated by vertical distances of 18 inches.

7. In a fuel bundle for receiving single phase water moderator at the bottom thereof and discharging two phase water and steam moderator at the top thereof, said fuel bundle comprising:
   an upstanding matrix of fuel rods;
   a lower tie plate for supporting said upstanding matrix of fuel rods and permitting the inflow of liquid moderator to said fuel bundle;
   an upper tie plate for maintaining said fuel rods in said side-by-side matrix and permitting the outflow of liquid and vapor moderator from said fuel bundle;
   a channel surrounding said fuel bundle, said channel extending from a single phase region of said fuel bundle adjacent said lower tie plate to a two phase region adjacent said upper tie plate for confining the flow of moderator between said tie plates and through said matrix of upstanding fuel rods for the generation of vapor moderator; and at least five spacers, each said spacer surrounding each said rod for maintaining said fuel rods in precise side-by-side relation one to another, said spacers having spaced vertical distribution along said matrix of fuel rods interior of said channel to prevent the flexibility of said fuel rods from causing said rods to come into contact under the forces of flow induced vibration or rod bow;

said spacers placed at uneven spatial intervals along the length of said fuel bundle, with at least two of said spacers at the bottom of said bundle in said single phase region adjacent said lower tie plate having closer relative vertical spacing and at least two of said spacers at the top of said bundle in said two phase region adjacent said upper tie plate having greater relative vertical spacing at the top of said fuel bundle.

8. The invention of claim 7 and including eight said spacers.

9. The invention of claim 7 and wherein said dimension between said upper and lower tie plates is 160 inches and said relative vertical separation of said lower spacers is about 16 inches and said relative vertical separation of said upper spacers is about 20 inches.

10. The invention of claim 7 and wherein said matrix of fuel rods comprises a 10×10 matrix.

11. The invention of claim 7 and wherein one of said fuel rods in said matrix is a partial length rod, said partial length rod supported on said lower tie plate, terminating before vertical extension to said upper tie plate, and braced at said upper end by one of said spacers.

12. The invention of claim 7 and wherein said fuel bundle includes eight spacers and said bottom three spacers are separated by center to center vertical distances of 16 inches, said top three spacers are separated by center to center vertical distances of 20 inches and spacers in between said top and bottom spacers are separated by vertical distances of 18 inches.

13. In a fuel bundle for receiving single phase water moderator at the bottom thereof and discharging two phase water and steam moderator at the top thereof, said fuel bundle comprising:

an upstanding matrix of fuel rods;

a lower tie plate for supporting said upstanding matrix of fuel rods and permitting the inflow of liquid moderator to said fuel bundle;

an upper tie plate for maintaining said fuel rods in said side-by-side matrix and permitting the outflow of liquid and vapor moderator from said fuel bundle;

a channel surrounding said fuel bundle for confining the flow of moderator between said tie plates and through said matrix of upstanding fuel rods for the generation of vapor moderator;

a single phase region of said fuel bundle commencing adjacent said lower tie plate and extending the beginning of a two phase region between said upper and lower tie plates;

a two phase region commencing at the upper portion of said single phase region and extending upward of said fuel bundle adjacent said upper tie plate; and at least five spacers, each said spacer surrounding each said rod for maintaining said fuel rods in precise side-by-side relation one to another, said spacers having spaced vertical distribution along said matrix of fuel rods interior of said channel to prevent the flexibility of said fuel rods from causing said rods to come into contact under the forces of flow induced vibration or rod bow;

said spacers at uneven spatial intervals along the length of said fuel bundle, with at least two of said spacers at the bottom of said bundle in said single phase region adjacent said lower tie plate having closer relative vertical spacing and at least two of said spacers at the top of said bundle in said two phase region adjacent said upper tie plate having greater relative vertical spacing at the top of said fuel bundle.

14. The invention of claim 13 and including eight said spacers.

15. The invention of claim 13 and wherein said dimension between said upper and lower tie plates is about 160 inches and said relative vertical separation of said lower spacers is about 16 inches and said relative vertical separation of said upper spacers is about 20 inches.

16. The invention of claim 13 and wherein said matrix of fuel rods comprises a 10×10 matrix.

17. The invention of claim 13 and wherein one of said fuel rods in said matrix is a partial length rod, said partial length rod supported on said lower tie plate, terminating before vertical extension to said upper tie plate in said upper two phase region, and braced at said upper end by one of said spacers.

18. The invention of claim 13 and wherein said fuel bundle includes eight spacers and said bottom three spacers are separated by center to center vertical distances of 16 inches, said top three spacers are separated by center to center vertical distances of 20 inches and spacers in between said top and bottom spacers are separated by vertical distances of 18 inches.

* * * * *